(12) United States Patent
Chen

(10) Patent No.: US 9,036,333 B2
(45) Date of Patent: May 19, 2015

(54) ELECTROLYTIC MATERIAL FORMULATION, ELECTROLYTIC MATERIAL POLYMER FORMED THEREFROM AND USE THEREOF

(75) Inventor: Shinn-Horng Chen, Kaohsiung (TW)

(73) Assignee: ETERNAL CHEMICAL CO., LTD., Kaohsiung (TW)

( * ) Notice: Subject to any disclaimer, the term of this patent is extended or adjusted under 35 U.S.C. 154(b) by 0 days.

(21) Appl. No.: 13/478,997

(22) Filed: May 23, 2012

(65) Prior Publication Data

US 2013/0170102 A1     Jul. 4, 2013

(30) Foreign Application Priority Data

Dec. 30, 2011    (TW) .............................. 100150085 A

(51) Int. Cl.
    *H01G 9/02*           (2006.01)
    *H01G 9/00*           (2006.01)
    (Continued)

(52) U.S. Cl.
    CPC .............. *C08G 61/123* (2013.01); *H01G 9/028* (2013.01); *H01G 9/15* (2013.01); *C08G 61/124* (2013.01);
    (Continued)

(58) Field of Classification Search
    CPC ......... H01G 9/15; H01G 9/012; H01G 9/042; H01G 9/025
    USPC .................................. 361/523, 525, 526, 528
    See application file for complete search history.

(56) References Cited

U.S. PATENT DOCUMENTS

| | | |
|---|---|---|
| 4,609,971 A | 9/1986 | Shaffer |
| 4,803,596 A | 2/1989 | Hellwig et al. |

(Continued)

FOREIGN PATENT DOCUMENTS

| | | |
|---|---|---|
| EP | 1 501 107 | 1/2005 |
| JP | 2005-120363 | 5/2005 |

(Continued)

*Primary Examiner* — Eric Thomas
*Assistant Examiner* — Arun Ramaswamy
(74) *Attorney, Agent, or Firm* — Greer, Burns & Crain, Ltd.

(57) ABSTRACT

An electrolytic material formulation and a polymer polymerized therefrom are provided. The formulation includes:
    (a) a monomer of formula (I); and

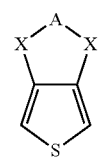

(I)

(b) a monomer of formula (II),

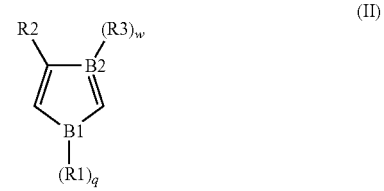

(II)

wherein, A, X, B1, B2, R1 to R3, q and w are defined as recited in the specification, and the amount of monomer (b) is about 1 part by weight to about 800 parts by weight per 100 parts by weight of monomer (a). The polymer is useful as an electrolytic material of a solid capacitor.

8 Claims, 1 Drawing Sheet

(51) Int. Cl.
*H01G 9/04* (2006.01)
*H01G 9/145* (2006.01)
*C08G 61/12* (2006.01)
*H01G 9/028* (2006.01)
*H01G 9/15* (2006.01)

(52) U.S. Cl.
CPC ...... C08G 61/126 (2013.01); *C08G 2261/1424* (2013.01); *C08G 2261/3221* (2013.01); *C08G 2261/3222* (2013.01); *C08G 2261/3223* (2013.01); *C08G 2261/3228* (2013.01); *C08G 2261/3229* (2013.01); H01G 9/0036 (2013.01)

(56) References Cited

U.S. PATENT DOCUMENTS

| | | |
|---|---|---|
| 4,910,645 A | 3/1990 | Jonas et al. |
| 2003/0139505 A1 | 7/2003 | Reuter et al. |
| 2006/0215353 A1* | 9/2006 | Iida et al. ............. 361/528 |
| 2006/0286760 A1* | 12/2006 | Kirschbaum ............ 438/381 |
| 2011/0190461 A1 | 8/2011 | Kita et al. |

FOREIGN PATENT DOCUMENTS

| | | |
|---|---|---|
| JP | 2011-228636 | 11/2011 |
| JP | 2011228636 A * | 11/2011 |
| WO | 2011/075644 | 6/2011 |

* cited by examiner

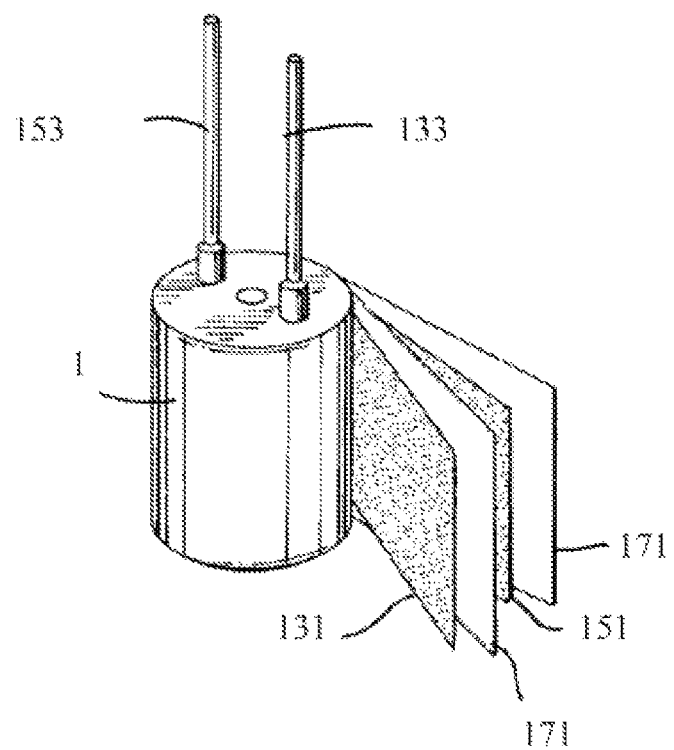

ELECTROLYTIC MATERIAL FORMULATION, ELECTROLYTIC MATERIAL POLYMER FORMED THEREFROM AND USE THEREOF

This application claims priority to Taiwan Patent Application No. 100150085 filed on Dec. 30, 2011.

CROSS-REFERENCES TO RELATED APPLICATIONS

Not applicable.

BACKGROUND OF THE INVENTION

1. Field of the Invention

The present invention relates to an electrolytic material formulation, an electrolytic material polymer formed from the electrolytic material formulation. In particular, the present invention relates to a solid capacitor using the electrolytic material polymer.

2. Descriptions of the Related Art

A capacitor is an electronic component widely used in various electronic products. Due to the development of miniaturized and lightweight electronic products, a capacitor with a smaller size, a higher electric capacity and a high-voltage applicable is required.

Generally, the capacitor can be categorized into liquid state capacitors and solid capacitors. Liquid state capacitor(s), such as aluminum liquid capacitor(s), use liquid electrolyte(s) as charge conducting media, wherein the liquid electrolyte(s) generally include high boiling alcohol(s), ionic liquid(s), boric acid, phosphoric acid, organic carboxylic acid(s), ammonium salt(s), high-polar organic solvent(s), a small amount of water, etc. The above ingredients can function as charge conducting media and repair the damaged dielectric layer on the anode surface of the capacitor as well. In the case of a aluminum liquid state capacitor where aluminum and aluminum oxide are respectively used as anode and a dielectric layer thereon, the aluminum layer will be exposed if defects occur on the dielectric layer and result in current leakage.). The liquid electrolytes will react with exposed aluminum metal to form aluminum oxide during the charging/discharging process, and the dielectric layer is thus, repaired. However, liquid state capacitor(s) usually have disadvantages, such as low conductivity, and weak heat resistance. In addition, during the repair of the dielectric layer, hydrogen is generated and this may cause the capacitor to explode and thus, damage the electronic products.

Solid state capacitor(s) use solid state electrolyte(s) as charge conducting media, with examples including organic semiconductor complex salts (e.g., tetracyanoquinodimethane (TCNQ)), inorganic semiconductors (e.g., $MnO_2$) and conducting polymer(s), wherein the preference is given to conducting polymer(s) with superior heat resistance and high conductivity. The solid capacitor has advantages, such as a long lifetime, superior stability, low equivalent series resistance (ESR), low capacitance change rate, and superior heat resistance and current endurance. As compared with liquid capacitor(s), solid state capacitor(s) do not have the risk of electrolyte leakage or capacitor explosion. In view of the above, the industries have all focused on the research and development of solid state capacitor(s).

U.S. Pat. No. 4,609,971 discloses a solid state capacitor using a conductive polymer. The solid state capacitor contains a conductive polyaniline polymer and is obtained by immersing the anode aluminum foil of the capacitor into a solution containing conductive polyaniline powders and $LiClO_4$ dopant, and then removing the solvent from the aluminum foil. However, the molecule size of polyaniline is too big to permeate into the micropores of the anode aluminum foil, and thus, the immersing performance is bad and the resistance of the obtained capacitor is high. To help the polymer penetrate into the micropores of the anode aluminum foil more easily, U.S. Pat. No. 4,803,596 discloses a method for preparing solid state capacitor(s) using conductive polymer(s) as electrolyte(s) by chemical oxidative polymerization. The method is carried out by immersing the anode aluminum foil into a conductive polymer monomer-containing solution and an oxidizing agent-containing solution respectively, and polymerizing the conductive polymer monomer, wherein the immersion and polymerization processes are repeated several times to form sufficient conductive polymer electrolytes. U.S. Pat. No. 4,910,645 discloses an aluminum solid state capacitor using poly-3,4-ethylenedioxythiophene (PEDOT) as an electrolyte, wherein the electrolyte is prepared using 3,4-ethylenedioxythiophene (EDOT) along with iron (III) p-toluenesulfonate (oxidizing agent). PEDOT is widely used as an electrolyte of solid state capacitor(s) in view of the advantages of superior heat resistance, high conductivity, high charge conducting rate, avirulence, a long lifetime, etc. However, the particle size of the conductive polymer thus formed is not uniform and has a wide distribution, i.e., has a large span value. The firstly formed conductive polymer molecules will aggregate with each other to weaken the mobility of unreacted monomer and oxidizing agent molecules and thus, lead to an incomplete polymerization. As a result, it is difficult to provide a completely and highly polymerized polymer structure on the surface and pores of the electrode (e.g., an aluminum foil). The polymer mainly presents in a form of a powder, which is difficult to adhere onto the surface and instead falls through the pores of the electrode. As a result, a solid state capacitor using PEDOT has a weak stability at high voltage (e.g., higher than 16 V) and limited working voltage. Therefore, the industries are all expected to develop a solid capacitor with superior withstand voltage and stability.

SUMMARY OF THE INVENTION

An objective of the present invention is to provide an electrolytic material formulation, comprising:

(a) a monomer of formula (I); and

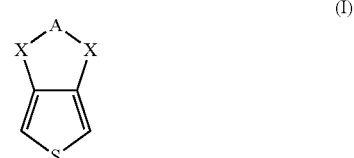

(b) a monomer of formula (II),

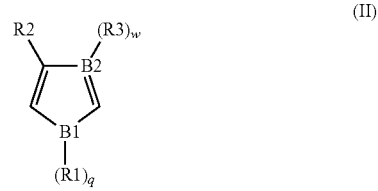

wherein
A is a C1-C4 alkylene group substituted with $(R_x)_p$;
X is O or S;
B1 is O, S or N;
B2 is N or C;
R1, R2, R3 and $R_x$ are independently H, a substituted or unsubstituted C1-C20 alkyl or alkoxy, a substituted or unsubstituted C6-C20 aryl;
p is an integer ranging from 0 to 2; and
q and w are independently an integer of 0 or 1,
and wherein the amount of the monomer (b) is about 1 part by weight to about 800 parts by weight based on 100 parts by weight of the monomer (a).

Another objective of the present invention is to provide a polymer that is useful as an electrolytic material obtainable by polymerizing the above electrolytic material formulation.

Yet another objective of the present invention is to provide a solid state capacitor, comprising an anode, a dielectric layer formed on the anode, a cathode, and a solid state electrolyte between the dielectric layer and the cathode, wherein the solid state electrolyte is the above polymer.

To render the above objectives, technical features and advantages of the present invention more apparent, the present invention will be described in detail with reference to some embodiments hereinafter.

BRIEF DESCRIPTION OF THE DRAWINGS

FIG. 1 is a schematic drawing of an embodiment of a capacitor component for forming the solid state capacitor of the present invention.

DESCRIPTION OF THE PREFERRED EMBODIMENT

The following will describe some embodiments of the present invention in detail. However, without departing from the spirit of the present invention, the present invention may be embodied in various embodiments and should not be limited to the embodiments described in the specification. Furthermore, the size of each component and area in the drawing may be exaggerated rather than drawn to scale for clarity. In addition, several expressions are defined as follows for a better understanding of the disclosure of the context.

First, unless it is additionally explained, the expressions "a," "the," or the like recited in the specification (especially in the claims) should include the singular and the plural forms, and the expression "substituted" recited in the specification means that H is substituted by a substituent which can be any groups or atoms other than "H." The expression "about" recited in the specification is an acceptable error of a specific value determined by those skilled in the art, and depends on the measuring method.

In the specification, "alkyl" includes linear or branched carbon chain groups. In some embodiments of the invention, the alkyl is a carbon chain group with 1 to 20 carbon atoms (C1-C20), 1 to 15 carbon atoms (C1-C15), 1 to 10 carbon atoms (C1 to C10) or 1 to 6 carbon atoms (C1-C6). Specific examples of alkyl include methyl, ethyl, propyl (all isomers), n-propyl, isopropyl, butyl (all isomers), n-butyl, isobutyl, tert-butyl, pentyl (all isomers) and hexyl (all isomers), but are not limited thereto.

"Alkylene" refers to linear or branched divalent carbon chain groups and may be optionally substituted with substituent(s). In some embodiments of the invention, the alkylene is a divalent carbon chain group with 1 to 4 carbon atoms (C1-C4). Specific examples of alkylene include methylene, ethylene, propylene (all isomers), n-propylene, isopropylene, butylene (all isomers), n-butylene, isobutylene and tert-butylene, but are not limited thereto.

"Alkoxy" refers to a group connecting with the rest part of the molecule (e.g., the alkyl described above) through an oxygen atom. Specific examples of alkoxy include methoxy, ethoxy, propoxy, n-propoxy, 2-propoxy, n-butoxy, isobutoxy, tert-butoxy, cyclohexyloxy, phenoxy, benzyloxy and 2-naphthoxy, but are not limited thereto.

"Aryl" refers to a monocyclic or polycyclic (such as bicyclic or tricyclic) aromatic group, wherein one or more of the ring(s) are aromatic ring(s). In some embodiments of the invention, aryl is a mono-valent aromatic group with 6 to 20 carbon atoms (C6-C20), 6 to 15 carbon atoms (C6-C15) or 6 to 10 carbon atoms (C6-C10). Specific examples of aryl include phenyl, naphthyl, fluorenyl, anthryl, phenanthryl, pyrenyl, biphenylyl, terphenylyl, dihydronaphthyl, indenyl, indanyl or tetralyl, but are not limited thereto.

The electrolytic material formulation of the present invention can be polymerized to form a polymer useful as the electrolytic material of the solid state capacitor. The polymer is excellent in withstand voltage (sparking voltage) and thus, the solid state capacitor using the same can withstand a higher working voltage such that the stability of the solid state capacitor is excellent even at high voltage (e.g., higher than 16V). In addition, when using the electrolytic material formulation of the present invention to provide the electrolytic material of the solid state capacitor, an aluminum foil with a lower withstand voltage property may be used as the electrode of the solid state capacitor since the withstand voltage property of the polymer polymerized from the formulation is excellent. In this condition, the capacitance of the capacitor is increased because the aluminum foil with a lower withstand voltage property has a larger surface area due to the its large pores; furthermore, the large pores of the aluminum foil helps the penetration of the monomers of the formulation during the production process of capacitors so that it is possible to form a complete (i.e., the degree of polymerization is high) polymer structure on the aluminum foil surface and the pores thereof. Thus, the polymer (as electrolytic material) can sufficiently adhere onto the surface as well as the pores and hard to drop down.

Specifically, the present invention relates to an electrolytic material formulation comprising:
(a) a monomer of formula (I); and

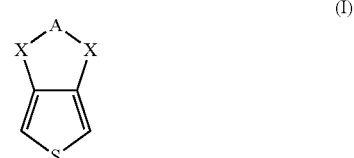

(I)

(b) a monomer of formula (II),

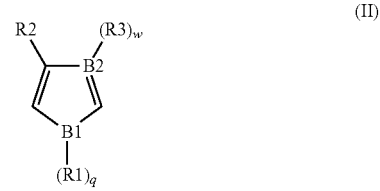

(II)

wherein, in the monomer (a), A is C1-C4 alkylene substituted with $(R_x)_p$; X is O or S; $R_x$ is H, a substituted or unsubstituted C1-C20 alkyl or alkoxy, or a substituted or unsubstituted C6-C20 aryl; and p is an integer ranging from 0 to 2. For example, the monomer (a) may be selected from the group consisting of

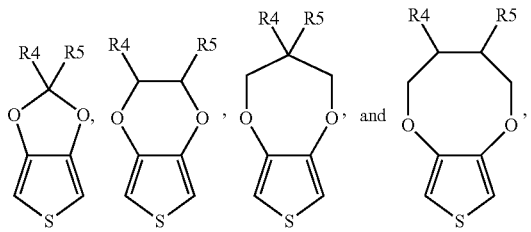

but is not limited thereto, wherein R4 and R5 are independently H, a substituted or unsubstituted C1-C15 alkyl or alkoxy, or a substituted or unsubstituted C6-C15 aryl; and preferably, R4 and R5 are independently H, or a C1-C3 alkyl or alkoxy. In some embodiments of the present invention, the monomer (a) is

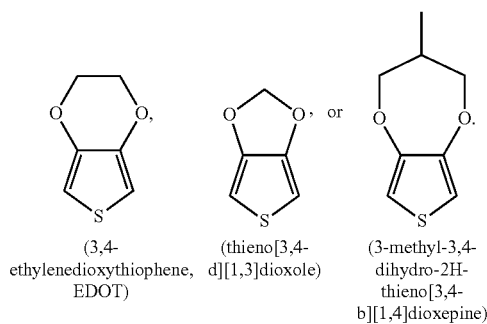

(3,4-ethylenedioxythiophene, EDOT)  (thieno[3,4-d][1,3]dioxole)  (3-methyl-3,4-dihydro-2H-thieno[3,4-b][1,4]dioxepine)

The monomer (b) of the formulation of the present invention can react with the monomer (a) to form a polymer structure with a high degree of polymerization and uniform particle size distribution. In the monomer (b), B1 is O, S or N; B2 is N or C; q and w are independently an integer of 0 or 1; R1, R2 and R3 are independently H, a substituted or unsubstituted C1-C20 alkyl or alkoxy, or a substituted or unsubstituted C6-C20 aryl (q is 0 when B1 is O or S; w is 0 when B2 is N.). Specifically, the monomer (b) may be selected from the group consisting of

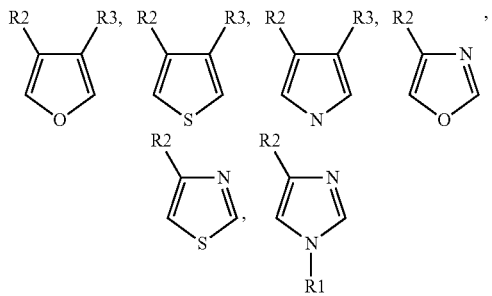

and combinations thereof, but is not limited thereto, wherein R1, R2 and R3 are independently H, a C1-C3 alkyl or alkoxy.

In some embodiments of the present invention, the monomer (b) is

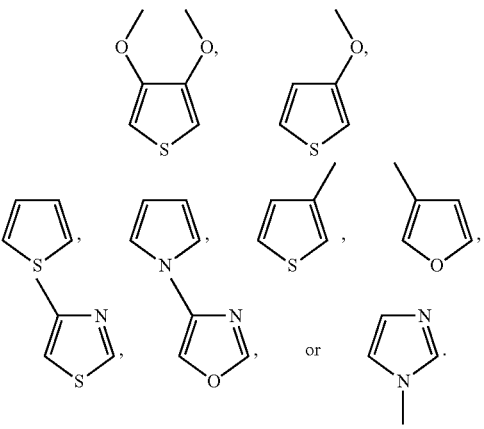

In the electrolytic material formulation of the invention, the ratio between the monomer (a) and the monomer (b) is not particularly limited and can be optionally adjusted by users. However, if the amount of the monomer (b) is too low, it may be disadvantageous to the withstand voltage of the solid state capacitor prepared therefrom; and if the amount of the monomer (b) is too high, it may be disadvantageous to the capacitance of the solid state capacitor prepared therefrom. In view of this, the amount of the monomer (b) is generally about 1 part by weight to about 800 parts by weight per 100 parts by weight of the monomer (a), and preferably about 5 parts by weight to about 400 parts by weight per 100 parts by weight of the monomer (a). In some embodiments of the present invention, the amount of the monomer (b) is about 5 parts by weight to about 400 parts by weight per 100 parts by weight of the monomer (a).

In the electrolytic material formulation of the present invention, the monomer (a) and the monomer (b) can react with each other to form a conductive polymer through an oxidative polymerization. The conductive polymer generated through the oxidative polymerization has a high withstand voltage property and is especially useful as the electrolytic material of the solid state capacitor. The oxidative polymerization is a polymerization performed in the presence of an oxidizing agent, and is generally performed at a temperature of about 25° C. to about 260° C., preferably at a temperature of 85° C. to about 160° C., based on the type of the oxidizing agent and the reaction time requirement. When the electrolytic material formulation of the present invention is applied in the preparation of solid state capacitor(s), the monomer (a) and the monomer (b) are oxidatively polymerized with each other to form the polymer in a capacitor component through "one-solution method" or "two-solution method."

"One-solution method" refers to the following steps: the monomer (a), the monomer (b) and a selected oxidizing agent are dissolved into a solvent to form a reaction solution, then, the capacitor component is immersed into the reaction solution for a predetermined time and lastly, the immersed capacitor component is heated to polymerize the monomer (a) and the monomer (b) therein to form a polymer. The "two-solution method" refers to the following steps: the monomer (a) and the monomer (b) are dissolved into a solvent to form a first reaction solution, while the selected oxidizing agent is dissolved into a second solvent to form a second reaction solution, the capacitor component is then immersed into the first reaction solution and the second reaction solution one after another for a predetermined time; and lastly, the immersed capacitor component is then heated to polymerize the monomer (a) and the monomer (b) therein to form a polymer.

Therefore, the electrolytic material formulation of the present invention may optionally contain oxidizing agent(s) such that the solid state capacitor can be prepared by the "one-solution method." If so, the formulation is preferably stored under a cold environment (e.g., 0° C.) to extend the storage life of the formulation.

In the application that uses the electrolytic material formulation of the present invention to provide electrolytic material of solid state capacitor(s), the solvent may be any inert solvent that can dissolve the monomer (a) and the monomer (b) and the optionally oxidizing agent, but not react with the monomer (a) and the monomer (b) under the oxidative polymerization condition. For example, the solvent may be water, alcohol(s), benzene(s) or a combination thereof, and preferably, methanol, ethanol, propanol, n-butanol, tert-butanol, water or a combination thereof.

The oxidizing agent used in the oxidative polymerization of the monomer (a) and the monomer (b) is not particularly limited, as long as it can promote the oxidative polymerization. For example, the oxidizing agent may be selected from the group consisting of alkali metal persulfates, ammonium salts, peroxides, iron(III) salts of organic acids, and combinations thereof, but not limited thereto. Preferably, the oxidizing agent may be selected from the group consisting of iron(III) p-toluenesulfonate, peroxides, ammonium sulfate salts, ammonium persulfate salts, ammonium oxalate salts, ammonium perchlorate salts, hydrogen peroxide, and mixtures thereof. According to the following examples of the specification, the oxidizing agent is iron(III) p-toluenesulfonate.

In addition, in the case where the electrolytic material formulation of the present invention contains the oxidizing agent, the amount of the oxidizing agent is not particularly limited, as long as the monomer (a) and the monomer (b) can be completely polymerized. Generally, the amount of the oxidizing agent is about 5 parts by weight to about 3000 parts by weight, preferably about 100 parts by weight to about 1000 parts by weight, and more preferably about 100 parts by weight to about 300 parts by weight, per 100 parts by weight of the total amount of the monomer (a) and the monomer (b). In some embodiments of the present invention, iron(III) p-toluenesulfonate is used as the oxidizing agent and the amount of the oxidizing agent is about 110 parts by weight to about 140 parts by weight per 100 parts by weight of the total amount of the monomer (a) and the monomer (b).

The present invention also provides a polymer useful as an electrolytic material obtainable from the oxidative polymerization of the electrolytic material formulation of the present invention. The polymer of the present invention has a highly-polymerized polymer structure, and has a molecular weight of about 1,000 to 500,000, and preferably, about 1,000 to about 50,000. The average particle size of the polymer of the present invention is about 10 nm to about 500 nm, and preferably about 10 nm to about 300 nm. The particle size distribution (span value) of the polymer ranges from about 0.1 to about 2. In addition, when the polymer of the present invention is used as an electrolytic material, its highly-polymerized polymer structure can prevent the short circuiting that occurs when, for example, the current leakage breaks down the anode, and enables the polymer to adhere on the electrode well. Furthermore, since the withstand voltage property of the polymer polymerized from the formulation is excellent, a metal foil with a relatively low withstand voltage property may be used as the electrode of the solid state capacitor to increase the surface area of the electrode and raise the capacitance of the capacitor through the pores of the metal foil.

The present invention also provides a solid state capacitor which comprises an anode, a dielectric layer formed on the anode, a cathode, and a solid state electrolyte between the dielectric layer and the cathode, wherein the solid state electrolyte is the polymer described above. The solid state capacitor of the present invention can withstand high voltage (above 50 volt) and has a high capacitance.

FIG. 1 is a schematic drawing of an embodiment of a capacitor component 1 for forming the solid state capacitor of the present invention. As shown in FIG. 1, the capacitor component 1 comprises an etched metal foil (e.g., an aluminum foil, a tantalum foil, a niobium foil, etc.) as the anode foil 131, a metal foil as the cathode foil 151, and a insulation paper 171 between the anode foil 131 and cathode foil 151, wherein the surface of anode foil 131 is covered by a dielectric layer (not shown in the FIGURE) and electrically connected to the anode wire 133, while the cathode foil 151 is electrically connected to the cathode wire 153. The capacitor component 1 is obtained by winding the anode foil 131, cathode foil 151 and insulating paper 171 into a cylindrical form. The solid state capacitor of the invention may be prepared using the "one-solution method" or "two-solution method" described above. In detail, the solid state capacitor may be prepared by immersing the capacitor component 1 into the reaction solution (or immersing the capacitor component 1 into the first reaction solution and the second reaction solution one after another), heat treating the immersed capacitor component 1 to form a solid state electrolyte between the anode 131 and cathode 151, and then performing a known assembly operation to obtain the solid state capacitor. In the solid state capacitor of the present invention, the number of anode foils 131 and cathode foils 151 are not particularly limited, and the number of anode foils 131 and cathode foils 151 may be identical or different. The number of anode wires 133 and cathode wires 153 are not particularly limited either as long as each anode 131 and cathode 151 is connected with a wire. In addition, the dielectric layer on the surface of anode 131 may be formed by oxidizing the surface of anode 131 in advance or further provided by other dielectric materials. The materials and the preparation methods of the above constituents can be easily accomplished by persons with ordinary skill in the art based on the disclosure of this specification.

The present invention is further illustrated based on the following examples, which are only for illustration and the scope of the present invention should not be limited thereto.

EXAMPLES

[The Preparation of the Electrolytic Material Formulation]

Example 1

30 g of

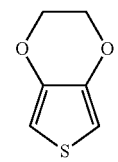

and 2.6 g of

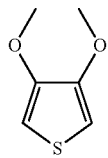

were dissolved in 100 g of 40% iron(III) p-toluenesulfonate ethanol solution to obtain electrolytic material formulation 1.

Example 2

30 g of

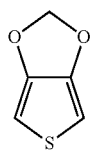

and 5.3 g of

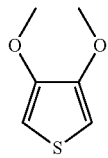

were dissolved in 100 g of 45% iron(III) p-toluenesulfonate ethanol solution to obtain electrolytic material formulation 2.

Example 3

7.9 g of

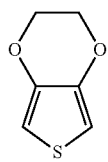

and 30 g of

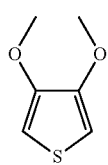

were dissolved in 100 g of 50% iron(III) p-toluenesulfonate ethanol solution to obtain electrolytic material formulation 3.

Example 4

30 g of

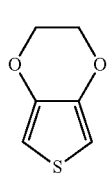

and 2.6 g of

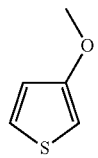

were dissolved in 100 g of 40% iron(III) p-toluenesulfonate ethanol solution to obtain electrolytic material formulation 4.

Example 5

30 g of

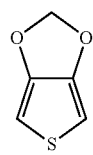

and 5.3 g of

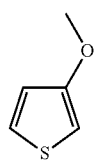

were dissolved in 100 g of 45% iron(III) p-toluenesulfonate ethanol solution to obtain electrolytic material formulation 5.

Example 6

7.9 g of

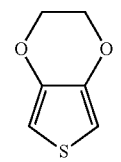

and 30 g of

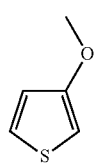

were dissolved in 100 g of 50% iron(III) p-toluenesulfonate ethanol solution to obtain electrolytic material formulation 6.

Example 7

30 g of

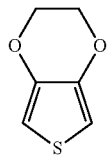

and 2.6 g of

were dissolved in 100 g of 40% iron(III) p-toluenesulfonate ethanol solution to obtain electrolytic material formulation 7.

Example 8

30 g of

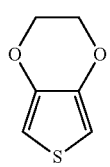

and 5.3 g of

were dissolved in 100 g of 45% iron(III) p-toluenesulfonate ethanol solution to obtain electrolytic material formulation 8.

Example 9

7.9 g of

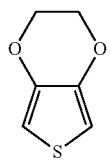

and 30 g of

were dissolved in 100 g of 50% iron(III) p-toluenesulfonate ethanol solution to obtain electrolytic material formulation 9.

Example 10

30 g of

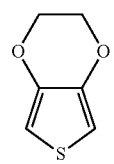

and 2.6 g of

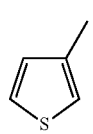

were dissolved in 100 g of 40% iron(III) p-toluenesulfonate ethanol solution to obtain electrolytic material formulation 10.

Example 11

30 g of

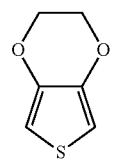

and 5.3 g of

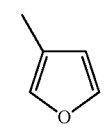

were dissolved in 100 g of 45% iron(III) p-toluenesulfonate ethanol solution to obtain electrolytic material formulation 11.

Example 12

7.9 g of

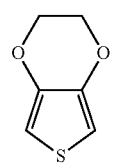

and 30 g of

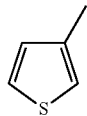

were dissolved in 100 g of 50% iron(III) p-toluenesulfonate ethanol solution to obtain electrolytic material formulation 12.

Example 13

30 g of

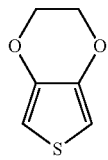

and 2.6 g of

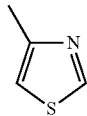

were dissolved in 100 g of 40% iron(III) p-toluenesulfonate ethanol solution to obtain electrolytic material formulation 13.

Example 14

30 g of

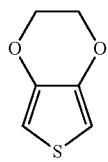

and 5.3 g of

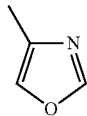

were dissolved in 100 g of 45% iron(III) p-toluenesulfonate ethanol solution to obtain electrolytic material formulation 14.

Example 15

7.9 g of

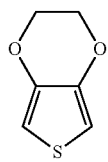

and 30 g of

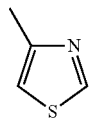

were dissolved in 100 g of 50% iron(III) p-toluenesulfonate ethanol solution to obtain electrolytic material formulation 15.

Example 16

30 g of

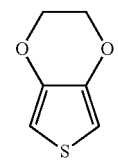

and 2.6 g of

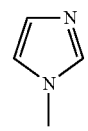

were dissolved in 100 g of 40% iron(III) p-toluenesulfonate ethanol solution to obtain electrolytic material formulation 16.

Example 17

30 g of

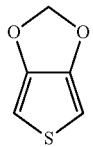

and 5.3 g of

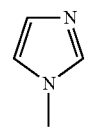

were dissolved in 100 g of 45% iron(III) p-toluenesulfonate ethanol solution to obtain electrolytic material formulation 17.

Example 18

7.9 g of

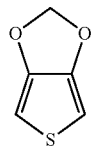

and 30 g of

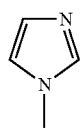

were dissolved in 100 g of 50% iron(III) p-toluenesulfonate ethanol solution to obtain electrolytic material formulation 18.

Example 19

30 g of

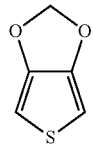

and 2.6 g of

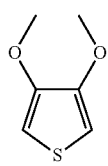

were dissolved in 100 g of 40% iron(III) p-toluenesulfonate ethanol solution to obtain electrolytic material formulation 19.

Example 20

30 g of

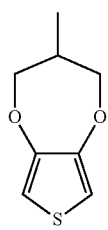

and 5.3 g of

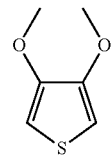

were dissolved in 100 g of 45% iron(III) p-toluenesulfonate ethanol solution to obtain electrolytic material formulation 20.

Example 21

7.9 g of

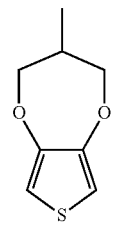

and 30 g of

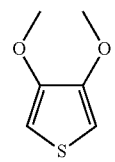

were dissolved in 100 g of 50% iron(III) p-toluenesulfonate ethanol solution to obtain electrolytic material formulation 21.

Comparative Example 22

30 g of

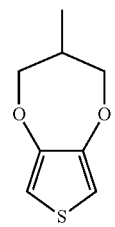

was dissolved in 100 g of 40% iron(III) p-toluenesulfonate ethanol solution to obtain comparative electrolytic material formulation 22.

[The Preparation of the Solid State Capacitor]

Solid state capacitors 1 to 21 and comparative solid state capacitor 22 were prepared using electrolytic material formulations 1 to 21 and comparative electrolytic material formulation 22 respectively according to the following methods. The capacitor component 1 as shown in FIG. 1 was immersed in a selected electrolytic material formulation for 5 minutes, and then the immersed capacitor component 1 was taken out from the formulation and heated at a temperature of about 25° C. to about 260° C. to carry out the polymerization to form a solid state electrolyte in the immersed capacitor component 1. The particle size distribution (in span value) of the solid state electrolyte was measured and the result was tabulated in Table 1. Next, the capacitor component 1 containing the solid state electrolyte was placed in a box with a bottom, and the box was then sealed with the wire exposed to obtain the solid state capacitor. The properties of the prepared solid state capacitors were measured respectively and the results were tabulated in Table 1, wherein the measuring instruments and the methods were as follows.

[Capacitance Measurement]

The capacitance of the solid state capacitor was measured by HP4284A LCR meter at 20° C. and 120 Hz.

[Withstand Voltage/Sparking Voltage Measurement]

The withstand voltage of the solid state capacitor was measured using Chroma Model 11200 capacitor current leakage/insulation resistance meter.

[Span Value Measurement]

The span value of the solid state electrolyte of the solid state capacitor was measured using HORIBA LA-950V2 laser particle size analyzer.

TABLE 1

|  | capacitance (mF, 120 Hz) | sparking voltage (volt) | span value |
| --- | --- | --- | --- |
| solid state capacitor 1 | 118 | 52 | 1.07 |
| solid state capacitor 2 | 107 | 62 | 0.92 |
| solid state capacitor 3 | 105 | 56 | 1.28 |
| solid state capacitor 4 | 98 | 59 | 0.96 |
| solid state capacitor 5 | 95 | 50 | 1.18 |
| solid state capacitor 6 | 95 | 51 | 1.17 |
| solid state capacitor 7 | 116 | 50 | 1.61 |
| solid state capacitor 8 | 120 | 50 | 1.38 |
| solid state capacitor 9 | 122 | 57 | 1.10 |
| solid state capacitor 10 | 101 | 57 | 1.20 |
| solid state capacitor 11 | 104 | 50 | 1.12 |
| solid state capacitor 12 | 106 | 53 | 1.32 |
| solid state capacitor 13 | 90 | 61 | 0.78 |
| solid state capacitor 14 | 99 | 67 | 0.49 |
| solid state capacitor 15 | 97 | 57 | 0.89 |
| solid state capacitor 16 | 105 | 53 | 1.05 |
| solid state capacitor 17 | 95 | 62 | 0.67 |
| solid state capacitor 18 | 95 | 59 | 0.92 |
| solid state capacitor 19 | 115 | 52 | 1.35 |
| solid state capacitor 20 | 109 | 50 | 1.24 |
| solid state capacitor 21 | 112 | 56 | 1.57 |
| comparative solid state capacitor 22 | 95 | 42 | 2.38 |

As shown in Table 1, the particle size distribution of the solid state electrolyte obtained by polymerizing the electrolytic material formulation of the present invention is very uniform (span value<2), and each of the capacitors prepared thereby (solid state capacitors 1 to 21) is provided with a outstanding capacitance and a sparking voltage (>50 volt) that is significantly superior than that of the known capacitor prepared by using 3,4-ethylenedioxythiophene alone (comparative solid state capacitor 22).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electrolytic material formulation, comprising:
a monomer (a) is selected from the group consisting of:

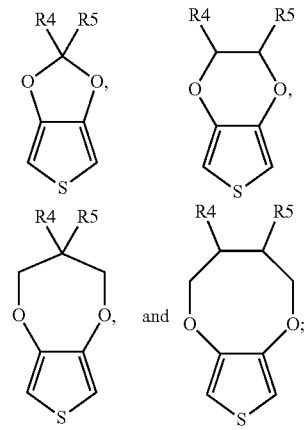

and a monomer (b) is selected from the group consisting of

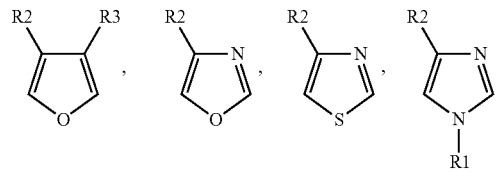

and combinations thereof, wherein,

R1, R2, R3 and R are independently H, or a C1-C3 alkyl or alkoxy;

R4 and R5 are independently H, a substituted or unsubstituted C1-C15 alkyl or alkoxy, or a substituted or unsubstituted C6-C 15 aryl; and wherein the amount of the monomer (b) is about 5 parts by weight to about 800 parts by weight per 100 parts by weight of the monomer (a).

2. The material formulation of claim 1, further comprising an oxidizing agent selected from the group consisting of alkali metal persulfates, ammonium salts, peroxides, ferric salts of organic acids, inorganic acids containing one or more organic groups, and combinations thereof.

3. The material formulation of claim 2, wherein the amount of the oxidizing agent is about 5 parts by weight to about 3000 parts by weight per 100 parts by weight of the total amount of monomer (a) and monomer (b).

4. A polymer useful as an electrolytic material obtained by polymerizing the material formulation of claim 1.

5. The polymer of claim 4, wherein the molecular weight of the polymer ranges from about 1,000 to about 500,000.

6. The polymer of claim 4, wherein the average particle size of the polymer ranges from about 10 nm to about 500 nm.

7. The polymer of claim 4, wherein the span value of the polymer ranges from about 0.1 to about 2.

8. A solid state capacitor, comprising:
an anode;
a dielectric layer formed on the anode;
a cathode; and a solid state electrolyte between the dielectric layer and the cathode, wherein the solid state electrolyte is the polymer of claim 4.

\* \* \* \* \*